E. HOLLINGS.

METHOD OF MAKING NUT BLANKS.

APPLICATION FILED AUG. 30, 1920.

Reissued Oct. 12, 1920. 14,958.

Inventor.
Ernest Hollings
By Brockett and Hyde
Attys.

UNITED STATES PATENT OFFICE.

ERNEST HOLLINGS, OF CLEVELAND, OHIO.

METHOD OF MAKING NUT-BLANKS.

14,958. Specification of Reissued Letters Patent. Reissued Oct. 12, 1920.

Original No. 1,342,676, dated June 8, 1920, Serial No. 175,093, filed June 16, 1917. Application for reissue filed August 30, 1920. Serial No. 407,058.

*To all whom it may concern:*

Be it known that I, ERNEST HOLLINGS, a subject of the King of England, residing at Cleveland, in the county of Cuyahoga and State of Ohio, have invented certain new and useful Improvements in Methods of Making Nut-Blanks, of which the following is a specification.

This invention relates to the manufacture of nut blanks, by indenting a bar at intervals and severing the partially shaped nut blanks therefrom. The invention has particular relation to the method of forming the nut blanks, and is an improvement upon the bar and method of my Patent No. 1,231,891, granted July 3, 1917, for manufacture of blanks for nuts.

According to the method of my prior application a bar of rectangular cross section is thickened along two opposite side faces, those faces which later become the side faces of the nut blanks, in a manner to concave both of the other two faces of the bar. This bar is then indented at intervals and the partially shaped blanks severed and pressed in a die.

Experience in the practice of said method particularly with the harder American metals as distinguished from the softer British iron, discovered the fact that it was advisable to turn the bar over after severing each nut to minimize, so far as possible the tendency to leave small transverse grooves in the top face of the pressed blank. These grooves or unfilled depressions were really traces of the concavity at the bottoms of the indentations accentuated by the tendency of the metal to draw down during the cutting off step. Although nut blanks of commercial quality can be obtained without reversing the bar trace of this groove in the finished blank is minimized by reversing, but even then, with hard metal, a very heavy pressure, not practical in ordinary working, is required to fill out and erase the groove by the flow of surrounding metal, especially in its chilled condition as the result of indenting.

The object of the present invention, therefore, is to provide a method which enables better nut blanks to be formed without reversing the bar, thereby saving the time of turning and materially increasing the rate of production; and which enables a practically perfect blank to be produced without unusually heavy pressure in the die, thereby saving considerable wear and tear on the tools and machine and also adapting the process to be carried out with the harder metals with the same or better results than when used for the softer British iron.

Figure 1:
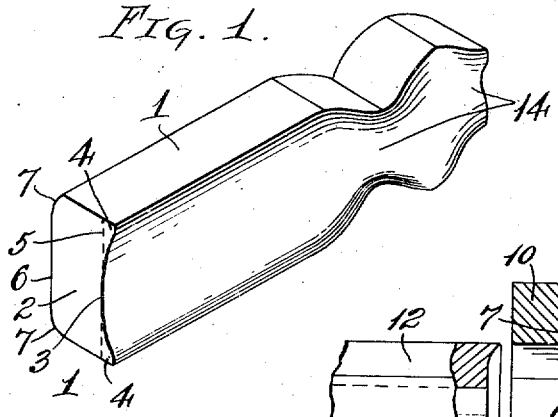
Figure 2:
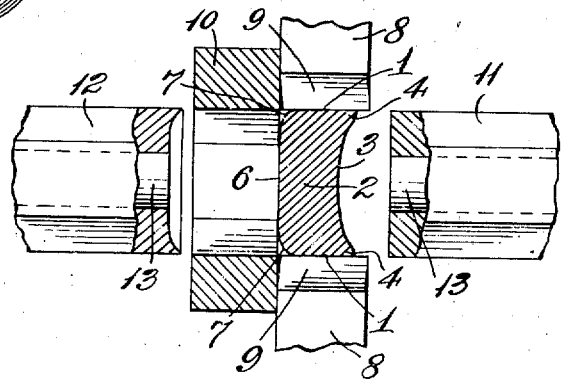
Figure 3:
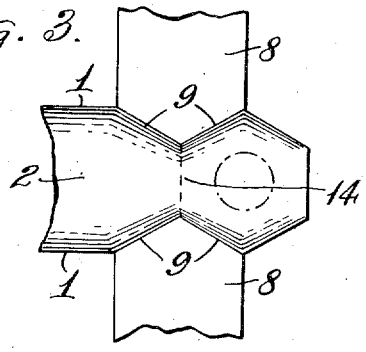
Figure 4:
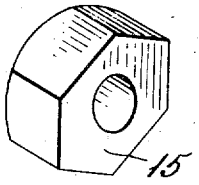

In the drawings, Figure 1 represents a perspective view of a bar for forming crowned nuts, with a portion of said bar indented to partially form one of a series of nuts; Fig. 2 is an elevation, showing the bar in section and illustrating the indenters ready to indent the bar; Fig. 3 is an elevation illustrating the bar indented; Fig. 4 is a perspective view of the finished nut blank; and Fig. 5 is a view corresponding to Fig. 1, and illustrating a bar suitable for manufacturing flat faced nut blanks, or blanks having no crown.

Referring to Fig. 1, the bar there shown has a cross section suitable for the formation of crowned nuts, although, as will appear, the invention may be practised for manufacturing flat faced nuts, and is also applicable as well for rectangular as for hexagonal nuts.

The bar shown in Fig. 1 may be produced in any suitable manner, for example, in a rolling mill, as is usual. Along two of its opposite faces, marked 1, said bar is thickened. In other words, in a direction in line with the axis of the formed nuts the bar is thicker at said two faces 1 than at its central portion 2. The thickening is effected in a manner to provide a concavity or channel 3 in one face only of the blank bar, and specifically this concave face is that face of the bar which is later presented to the cut off tool. Substantially, the thickening effect is produced by the addition to the bar of the small substantially triangular portions marked 4, which extend out beyond the dotted line 5, representing the normal flat face of the bar.

Figure 5:
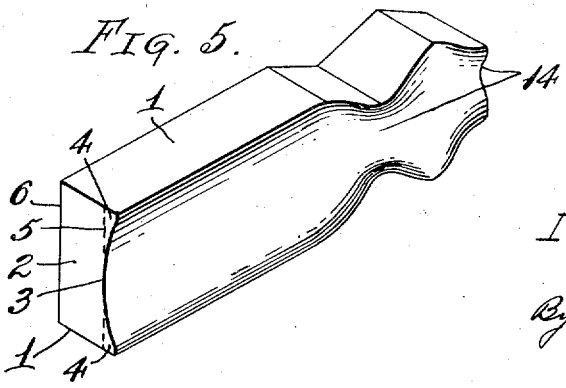

For making flat faced nuts, to-wit, nuts having no crown, the opposite face 6 of the bar is flat from side to side, as indicated in Fig. 5, but for making crowned nuts this face of the bar is roughly given the contour of the crown to be produced, as by slightly curving the face 6 at the two opposite sides of the bar, as indicated at 7, Fig. 1.

The bar, so formed, is submitted to the action of the forming tools of a well known nut making machine, the tools of which are partially shown in the drawings. These tools include the indenters 8, having V-shaped end working faces 9, the die block 10, the cut off tool 11, its companion compressing tool 12, and the central alined punches 13. The bar is fed into the said machine at intervals with the concave face presented to the cut off tool 11. During the period or interval between feeding motions the several tools described complete their functions. The first step is the operation of the indenting tools 8, which come in from above and below and indent the thickened faces or edges 1 of the bar, as shown in Fig. 3. This operation carries a portion of the thickened edges of the bar toward its thinner central portion, as indicated by the shade lines 14, thereby supplying the deficiency in the thinner central portion of the bar. The cut off tool 11 next moves in and shears off the partially formed blank from the end of the bar and carries it into the die 10, where it is compressed between the cut off tool 11 and its companion alined tool 12. In this compressing operation there is little difficulty in producing a flat face on that side of the blank presented to the cut off tool 11. The main difficulty, heretofore, has been in the production of a smooth face on the opposite side of the blank, and, as heretofore stated, this face of the blank has carried traces of the concavity in one of the faces of the blank bar from which the nut was sheared. However, in the present bar, the opposite face of the bar, indicated at 6, is not concave, and even may be slightly convex, as when crowned nut blanks are being made. Consequently, this face of the bar bears no traces of a concavity or channel and is finished in practically perfect smooth form. As in my prior method, the central portion of the nut blank is filled out by expanding action of the central punches, and the structure of the bar itself, together with the action of the indenting tools, supplies the necessary metal for filling out the corners of the blank nut.

It should be pointed out that even that form of bar utilized for making crowned nut blanks is thicker at its edges than at its central portion at the bottom of the longitudinal concavity. In other words the depth of the side faces 1 of the bar is usually equal to or possibly slightly greater than the thickness of the finished nut, whereas the thickness of the bar from the base of the concavity in one face to its opposite face 6 is less than the thickness of the finished nut, possibly about three-quarters thereof. Therefore, the blank bar is always thicker along the two edges than at its middle portion.

This method produces nuts of the form shown in Fig. 4, with a perfectly flat face 15 on one side, a face on its opposite side which may be either flat or crowned in accordance with the shape of the blank bar, and with side faces which are perfectly true and with corners fully filled out. The method does not entail any reversing of the bar between the steps of severing successive nuts. Consequently the time required for this reversing operation is saved and the machine operates at a higher speed and with greater output. Moreover, the metal is so handled by the formation of the initial blank bar and in its treatment by the tools that excessive or unusually heavy pressure of the tools is not required and the fully filled out blank is produced with normal pressure such as can be obtained from the average machine without imposing unusually heavy duty thereon. At the same time, the method can be practised with the harder grades of metal, and is not limited to softer metals such as the soft British iron.

What I claim is:—

1. The method of manufacturing nut blanks, consisting in indenting at intervals a blank bar thickened at its edges to provide a longitudinal concavity on one side only, and shearing successive nut blanks from said bar.

2. In a method of manufacturing nut blanks, the step of indenting at intervals a blank bar thickened at its edges to provide a longitudinal concavity on one side only and a longitudinally extending convexity upon its opposite side.

In testimony whereof I affix my signature.

ERNEST HOLLINGS.